Oct. 31, 1950           R. RUFF           2,528,083
ELECTRIC FISH PLUG
Filed Nov. 30, 1949
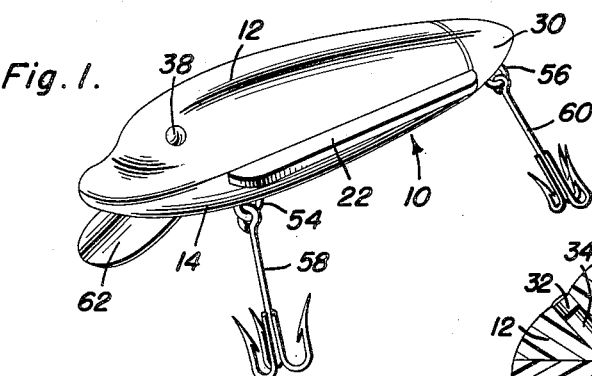
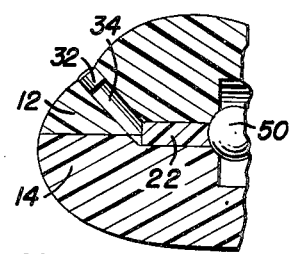
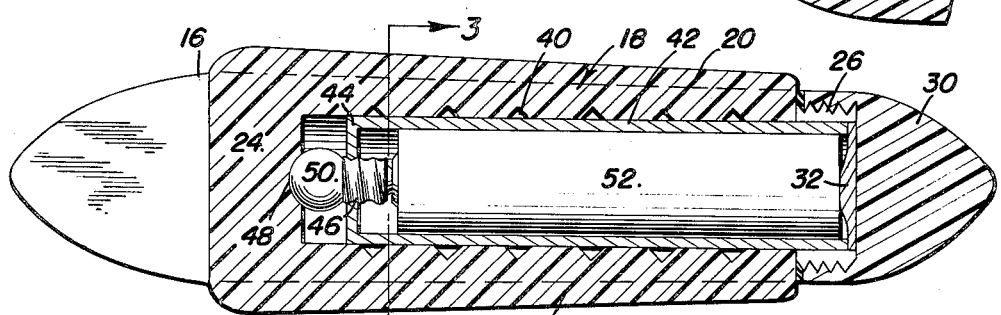
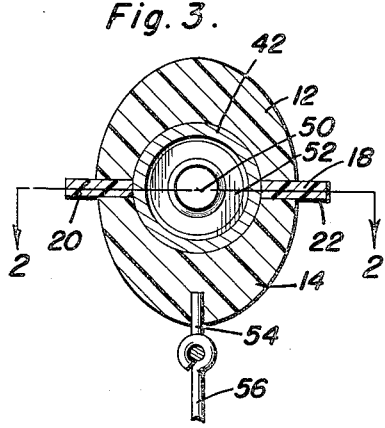
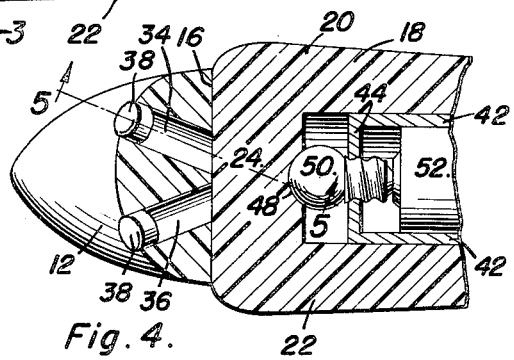
Raymond Ruff
INVENTOR.

Patented Oct. 31, 1950

2,528,083

UNITED STATES PATENT OFFICE 2,528,083

ELECTRIC FISH PLUG

Raymond Ruff, East Chicago, Ind.

Application November 30, 1949, Serial No. 130,283

2 Claims. (Cl. 43—17.6)

This invention relates to sporting equipment, and more particularly to an artificial fish lure or bait.

An object of this invention is to provide a fish plug or lure which will have means for illuminating at least a portion of the body of the plug in a manner to attract fish.

Another object of the invention is to provide means permanently connecting a battery for mounting a lamp in an operative position relative to the battery so that the battery and lamp may be inserted and removed as an assemblage from the body of the bait.

Yet another object of the invention is to provide a lure or plug of novel construction so as to provide a water-tight protective shell for the light providing means.

Still another object of the invention resides in the provision of means associated with the body of the plug which will simulate the phosphorescence caused by a minnow or other small fish swimming through a body of water.

Still further objects of the invention reside in the provision of an artificial bait lure that is strong, durable, highly efficient in operation, simple in construction and design, capable of being used for day or night fishing, highly attractive in appearance, easy to manufacture and assemble, and relatively inexpensive.

These, together with the various ancillary objects of the invention which will become apparent as the following description proceeds, are attained by this electric fish plug, a preferred embodiment of which has been illustrated in the accompanying drawings, by way of example, wherein:

Figure 1 is a perspective view of the assembled electric fish plug;

Figure 2 is a horizontal section view of the invention as taken along line 2—2 in Figure 3;

Figure 3 is a vertical sectional view as taken along line 3—3 in Figure 2;

Figure 4 is a sectional detail showing how light is transmitted through the eyes of the fish; and Figure 5 is a sectional detail view as taken along the plane of line 5—5 in Figure 4.

With continuing reference to the accompanying drawings wherein like reference numerals designate similar parts throughout the various views, reference numeral 10 is used to generally designate the electric fish plug or artificial bait comprising the present invention.

The hollow body of the bait is formed from a pair of sections, that is, upper section 12 and lower section 14. Each of the sections is recessed adjacent the front end thereof as at 16 to form a shoulder and recess for reception of a fin element generally indicated by reference numeral 18.

The fin element 18 consists of a pair of substantially parallel fins 20 and 22 which are connected by a central connecting portion 24 at their front ends. While the body members 12 and 14 are preferably formed or molded from a colored and opaque plastic material, the fin element 18 is formed from a substantially transparent plastic.

The rear ends of the body sections are externally threaded as at 26 and a cap 30 having an internally threaded recess is screwed over the ends 26 and 28 to hold them in a substantially rigid and tight embrace. A copper plate 32 is fitted into the recess in the cap 30 and has a central button or projection formed thereon for a purpose to be henceforth explained.

The upper section 12 of the hollow body is formed with a pair of converging apertures 34 and 36 which open into the outer surface of the fish plug and are closed by the central portion 24 of the fin member 18. Artificial eyes, as shown best in Figure 1, and represented by reference numeral 38 may be emplaced in the apertures 34 and 36 and secured therein in a waterproof manner by a cellulose acetate cement. The fin member 18 is preferably formed with a plurality of notches 40 and is rigidly secured to the body sections 12 and 14 by a cellulose acetate cement or other suitable means.

A tubular container 42 having an end wall 44 which has an aperture 46 therethrough is adapted to be emplaced within a hollow body between the fins 20 and 22 and between the sections 12 and 14. A central connecting portion 24 is provided with a recess 48 for reception of the front portion of an electric bulb 50 which extends through aperture 46. A battery 52 is emplaced within the tubular member 42 and when the cap 30 is screwed onto the end portions 26 and 28 the copper plate 32 will abut the battery 52 to complete an electric circuit and cause the bulb 50 to light.

Obviously, when the light bulb 50 is actuated, the light emitted will be transmitted through the transparent fin member 18 and through the passageways 34 and 36 through the eye members 38. Thusly, the plug will simulate a light emitted by the eyes of a minnow or the like together with a simulated phosphorescent wake or the like of the minnow swimming through the water. The fins 22 and 20 when lighted are very effective in realistically representing the motion of the fins of a small fish.

Secured to the bottom of the body member and to the cap 30 are eyes 54 and 56 which have fishhooks 58 and 60 attached thereto in a pivotal manner. A metal lip 62 is secured to the lower section 14 of the body to cause the fish plug to dive when it is being retrieved.

It is within the contemplation of the invention to make the fish bait or any portions thereof out of glass or any transparent or opaque material of the respective parts. Furthermore, the notches 40 will tend to prevent undue slippage of the tubular container 42 relative to the body sections 12 and 14 and to the fin element 18. A substantially water-tight night and day fishing lure is thusly provided which may be readily used in fresh water, salt water, or in surf fishing.

Since from the foregoing, the construction and advantages of this artificial fish lure is readily apparent, further description is believed to be unnecessary.

However, since numerous modifications will readily occur to those skilled in the art after a consideration of the foregoing specification and accompanying drawings, it is not intended to limit the invention to the precise embodiment of the electric fish plug shown and described, but all suitable modifications and equivalents may be resorted to which fall within the scope of the appended claims.

Having described the invention, what is claimed as new is:

1. A fishing lure comprising a hollow body member having an externally threaded rear portion, said hollow body member being divided into upper and lower sections, a substantially transparent fin element secured between said upper and lower sections and extending outwardly therefrom, said fin element being of substantially U-shape, means secured within said hollow body member for selectively emitting light, and a tail member threadedly engaged on said rear portion abutting said means and holding said sections in rigid relationship.

2. A fishing lure comprising a hollow body member having an externally threaded rear portion, said hollow body member being divided into upper and lower sections, a substantially transparent fin element secured between said upper and lower sections and extending outwardly therefrom, said fin element being of substantially U-shape having a pair of substantially parallel longitudinally extending fins and a central connecting portion, a plurality of apertures in said upper section, said central connecting portion abutting said upper section to close off said apertures, means secured within said hollow body member for selectively emitting light, and a tail member threadedly engaged on said rear portion abutting said means and holding said sections in rigid relationship.

RAYMOND RUFF.

REFERENCES CITED

The following references are of record in the file of this patent:

UNITED STATES PATENTS

| Number | Name | Date |
| --- | --- | --- |
| 573,572 | Dales | Dec. 22, 1896 |
| 1,982,609 | Freese | Nov. 27, 1934 |
| 2,066,458 | De Witt | Jan. 5, 1937 |
| 2,187,609 | Larson | Jan. 16, 1940 |